US009908401B2

(12) United States Patent
Abe (10) Patent No.: US 9,908,401 B2
(45) Date of Patent: Mar. 6, 2018

(54) FLAP VALVE DEVICE AND GAS LIQUID SEPARATION DEVICE PROVIDED WITH FLAP VALVE DEVICE (71) Applicant: NIFCO INC., Yokosuka-shi, Kanagawa (JP)

(72) Inventor: Ryota Abe, Yokosuka (JP)

(73) Assignee: NIFCO INC., Kanagawa (JP)

(*) Notice: Subject to any disclaimer, the term of this patent is extended or adjusted under 35 U.S.C. 154(b) by 8 days.

(21) Appl. No.: 15/101,542

(22) PCT Filed: Dec. 1, 2014

(86) PCT No.: PCT/JP2014/005991
§ 371 (c)(1),
(2) Date: Jun. 3, 2016

(87) PCT Pub. No.: WO2015/087506
PCT Pub. Date: Jun. 18, 2015

(65) Prior Publication Data
US 2017/0015192 A1 Jan. 19, 2017

(30) Foreign Application Priority Data
Dec. 10, 2013 (JP) ................................ 2013-254672

(51) Int. Cl.
B60K 15/035 (2006.01)
F02M 25/08 (2006.01)
(Continued)

(52) U.S. Cl.
CPC .. B60K 15/03519 (2013.01); B60K 15/03504 (2013.01); F02M 25/089 (2013.01);
(Continued)

(58) Field of Classification Search
CPC .... B60K 15/03519; B60K 2015/03576; F16K 24/04; F16K 1/2007; F02M 25/089; F02M 25/0836; F02M 25/0854
See application file for complete search history.

(56) References Cited

U.S. PATENT DOCUMENTS 4,715,509 A * 12/1987 Ito .......................... B60K 15/04
141/59
4,809,865 A * 3/1989 Mori ................ B60K 15/03504
123/519
(Continued)

FOREIGN PATENT DOCUMENTS

DE 102008061264 A1 6/2010
JP 6278480 A 10/1994
(Continued)

OTHER PUBLICATIONS

International Search Report for International Application No. PCT/JP2014/005991, dated Jan. 20, 2015, 2 pages.
(Continued)

Primary Examiner — Nicolas A Arnett
(74) Attorney, Agent, or Firm — Armstrong Teasdale LLP (57) ABSTRACT Provided is a flap valve device and a gas liquid separation device provided with a flap valve. The flap valve device includes a main body having an opening, a flap for selectively closing the opening and a torsion coil spring provided between the main body and the flap for biasing the flap in an opening direction. The flap valve device further comprises a main body side bearing; a flap side bearing; a connecting member including a hinge shaft passed through the main body side bearing, the flap side bearing and the torsion coil spring, and an extension extending from an end of the hinge shaft along an outer part of the flap; and a spring engagement portion provided on the main body for engaging an end of
(Continued)

the torsion coil spring; another end of the torsion coil spring being engaged by the extension, which is engaged on the flap.

9 Claims, 8 Drawing Sheets (51) Int. Cl.
*F16K 1/20* (2006.01)
*F16K 24/04* (2006.01)
*B60K 15/03* (2006.01)

(52) U.S. Cl.
CPC ....... *F02M 25/0836* (2013.01); *F16K 1/2007* (2013.01); *F16K 24/04* (2013.01); *B60K 2015/03269* (2013.01); *B60K 2015/03576* (2013.01); *B60K 2015/03595* (2013.01); *F02M 25/0854* (2013.01)

(56) References Cited

U.S. PATENT DOCUMENTS

| | | | | |
|---|---|---|---|---|
| 4,917,157 A * | 4/1990 | Gifford | ............ | B60K 15/04 |
| | | | | 123/519 |
| 5,022,433 A * | 6/1991 | Jansky | ............ | B60K 15/04 |
| | | | | 137/588 |
| 5,027,868 A * | 7/1991 | Morris | ............ | B60K 15/03519 |
| | | | | 137/587 |
| 5,195,566 A * | 3/1993 | Ott | ............ | B60K 15/0406 |
| | | | | 141/312 |
| 5,975,128 A * | 11/1999 | Schatz | ............ | F02D 9/06 |
| | | | | 123/323 |
| 6,029,719 A * | 2/2000 | Hor | ............ | B60K 15/035 |
| | | | | 137/588 |
| 6,394,129 B1 * | 5/2002 | Feichtinger | ...... | B60K 15/03519 |
| | | | | 123/516 |
| 7,082,973 B2 * | 8/2006 | Ganachaud | ............ | B60K 15/04 |
| | | | | 141/350 |
| 8,485,386 B2 * | 7/2013 | Koukan | ............ | B60K 15/035 |
| | | | | 220/4.14 |
| 8,596,311 B2 * | 12/2013 | Erdmann | ......... | B60K 15/03519 |
| | | | | 123/518 |
| 2006/0169356 A1 * | 8/2006 | Ganachaud | ............ | B60K 15/04 |
| | | | | 141/350 |
| 2008/0184972 A1 | 8/2008 | Ehrman et al. | | |
| 2010/0012223 A1 * | 1/2010 | Yoshida | ............ | B60K 15/0406 |
| | | | | 141/350 |
| 2010/0147863 A1 | 6/2010 | Grun et al. | | |

FOREIGN PATENT DOCUMENTS

| | | |
|---|---|---|
| JP | 10325373 A | 12/1998 |
| JP | 2007331518 A | 12/2007 |
| KR | 1020080073262 | 8/2008 |

OTHER PUBLICATIONS

Notice of Submission of Opinion of Korean Patent Application No. 2016-7018314, dated Nov. 17, 2017, 11 pages.
Extended European Search Report for Application No. 14869475.5, dated Aug. 11, 2017, 5 pages.

* cited by examiner

FLAP VALVE DEVICE AND GAS LIQUID SEPARATION DEVICE PROVIDED WITH FLAP VALVE DEVICE

TECHNICAL FIELD

The present invention relates to a flap valve device and a gas liquid separation device provided with a flap valve device, and in particular to a gas liquid separation device for removing liquid from fuel vapor that flows from a fuel tank of a motor vehicle into a fuel vapor canister.

BACKGROUND OF THE INVENTION

A fuel tank of a motor vehicle is typically provided with a fuel vapor passage for expelling fuel vapor from the fuel tank and a fuel vapor canister provided in the fuel vapor passage for absorbing the fuel vapor. The fuel absorbed by the canister is drawn from the canister by the intake negative pressure of the intake system, and flows into the combustion chambers via the intake system. In this manner, the fuel vapor is prevented from being released to the atmosphere, and an excessive rise in the internal pressure of the fuel tank can be avoided.

In such a fuel tank, it is known to open out an end of the fuel vapor passage in an upper part of the fuel tank, and selectively close the open end with a float valve. The float valve moves up and down in dependence on the liquid level of the fuel tank so that the fuel vapor passage is closed when the liquid level rises beyond a prescribed value to prevent the fuel liquid from flowing into the fuel vapor passage. However, when a rapid rise in the liquid or bubbling of the fuel should occur, the fuel liquid could flow into the fuel vapor passage. To remove the fuel liquid that happens to flow into the fuel vapor passage, and prevent the fuel liquid from reaching the fuel vapor canister, it has been proposed to provide a gas liquid separation device in an intermediate point of the fuel passage. See Patent Document 1, for instance.

In the gas liquid separation device disclosed in Patent Document 1, the fuel liquid separated from the fuel vapor is expelled to the filler pipe that connects the filler opening with the fuel tank. The gas liquid separation device includes a main pipe that extends vertically and has a lower end extending into the filler pipe. The main pipe is closed at the upper end and opens out at the lower end. The interior of the main pipe is separated into a first passage and a second passage by a partition wall extending along the axial line of the main pipe. The upper end of the first passage is connected to the fuel tank side end of the fuel vapor passage, and the upper end of the second passage is connected to the canister side of the fuel vapor passage. The gas liquid separation device includes a normally open type flap valve device which is pivotally attached to the interior of the filler pipe to selectively close the lower end of the main pipe. The flap of the flap valve device is normally in the open position, and can be pushed into the closed position to close the open end of the main pipe by the filler nozzle inserted into the filler pipe during refueling. The flap is configured such that a gap is created between the flap and the partition wall when the flap closes the open end of the main pipe.

In this gas liquid separation device, the fuel vapor that flows through the fuel vapor passage is passed downward through the first passage, and upward through the second passage via the interior of the filler pipe before reaching the canister. The fuel liquid that may flow in the fuel vapor passage passes from the first passage to the filler pipe under the gravitational force, and does not reach the canister. During refueling, the open end of the main pipe is closed by the filler nozzle pushing the flap into the closed position so that the fuel liquid flowing through the filler pipe does not flow into the main pipe. When the open end of the main pipe is closed, the fuel vapor can pass through the gap between the partition wall and the flap, and flows into the canister via the second passage. On the other hand, the fuel liquid is trapped in the lower end of the main pipe or on top of the flap. When the filler nozzle is pulled out of the filler opening, and the flap opens as a result, the fuel liquid that may have collected on the flap flows into the filler pipe.

PRIOR ART DOCUMENT(S)

Patent Document(s)

Patent Document 1: DE10 2008 061 264A

SUMMARY OF THE INVENTION

Task to be Accomplished by the Invention

In such a normally open type flap valve device, a hinge bearing is formed on each of a main body of the device and a flap, and a hinge shaft made of metallic material is passed into the hinge bearings of the main body and the flap. The two ends of the hinge shaft are then crimped so as to keep the hinge shaft in position. In this case, a special tool is required for crimping the two ends of the hinge shaft, and the crimping work is required to be performed in a precise manner so that each crimped part of the hinge shaft has a proper length and width. Therefore, the efficiency of the assembly work is poor. Also, as the hinge shaft has to have a sufficient length for the crimping work to be performed in the two ends thereof, the two ends protrude from the respective ends of the hinge, and this impairs the external appearance. Furthermore, owing to the increased length of the hinge axis for the crimping purpose, the hole formed in the filler pipe for inserting the gas liquid separation device into the filler pipe has to be increased in size for passing the hinge shaft through the hole. Also, a torsion coil spring needs to be interposed between the main body and the flap to urge the flap to the normally open position. The torsion coil spring is typically placed on the outer side of the main body and the flap so that the two ends of the torsion coil spring are required to be engaged by features provided on the outer side of the main body and the flap, respectively. The engagement structure for engaging the two ends of the torsion coil spring on the outer side of the main body and the flap tends to be highly complicated as there is a need to engage the two ends in a stable manner, and this additionally impairs the efficiency of the assembly work.

In view of such problems of the prior art, a primary object of the present invention is to provide a flap valve device and a gas liquid separation device provided with a flap valve wherein the flap valve device is highly compact, and is easy to assemble.

Means to Accomplish the Task

To achieve such an object, the present invention provides a normally open flap valve device (2) comprising a main body (5) having an opening (4), a flap (6) for selectively closing the opening and a torsion coil spring (7) provided between the main body and the flap for biasing the flap in an opening direction, the flap valve device further comprising:

a main body side bearing (21) provided on the main body; a flap side bearing (25) provided on the flap; a connecting member (27) including a hinge shaft (27A) passed through the main body side bearing, the flap side bearing and a coil portion (7A) of the torsion coil spring so as to serve as a pivot shaft for the flap, and an extension (27B) extending from an end of the hinge shaft along an outer part (6B) of the flap; and a spring engagement portion (43) provided on the main body for engaging an end of the torsion coil spring; another end of the torsion coil spring being engaged by the extension, the extension being engaged on the outer part of the flap.

According to this arrangement, the main body, the flap, the connecting member, the torsion coil spring and the support member can be assembled by the engagement features provided in these components, and the need for crimping and other work requiring tools is eliminated. Therefore, the assemble work is facilitated. Because the extension of the connecting member is retained by using the support member engaged by the inner part of the flap, the extension can be engaged by the flap simply by positioning the extension to a prescribed position on the flap and engaging the support member with the flap so that the work required for securing the extension to the flap can be facilitated.

In this invention, the flap valve device may further comprise a support member (33) attached to the outer part of the flap for receiving a force for rotating the flap in a closing direction, the support member engaging the extension on the outer part of the flap.

According to this arrangement, because the extension is engaged by using the support member which is attached to the outer part of the flap, the extension can be secured to the flap simply by positioning the extension on a prescribed position on the flap and engaging the support member onto the flap.

In this invention, the flap valve device may further comprise a first engagement portion (37) provided on the outer part of the flap for engaging the extension in such a manner that the extension is prevented from moving in an axial direction of the hinge shaft relative to the flap, and is allowed to rotate around the hinge shaft relative to the flap, wherein the support member when attached to the flap engages the extension against a rotational motion of the extension around the hinge shaft, and the extension engages the other end of the torsion coil spring against a rotational motion of the other end of the torsion coil spring around the hinge shaft.

According to this arrangement, by engaging the extension with the first engagement portion, the connecting member is prevented from moving in the axial direction of the hinge shaft so that the hinge shaft is prevented from coming off the main body side bearing and the flap side bearing. As the extension is engaged by the support member so as to be fixed relative to the flap with respect to the rotation around the hinge shaft, the extension is prevented from being detached from the first engagement portion. Before the support member is engaged by the flap, the extension can be easily positioned onto the first engagement portion by rotating the extension around the hinge shaft so that the positioning of the extension onto the first engagement portion is facilitated.

In this invention, a through hole (31) may be formed in the outer part of the flap, and the support member may include a front end (33A) passed through the through hole and projecting out of the through hole, and an engagement claw (33F) configured to be engaged by a peripheral edge of the through hole.

According to this arrangement, the mounting of the support member onto the flap and the engagement of the extension with the support member can be accomplished simply by inserting the support member into the through hole.

In this invention, the outer part of the flap is provided with a second engagement portion (41) for engaging the other end of the torsion coil spring to restrict a movement of the other end of the torsion coil spring along an axial line of the hinge shaft relative to the flap, and to permit a rotation of the other end of the torsion coil spring around the hinge shaft relative to the flap.

According to this arrangement, the position of the other end of the torsion coil spring is determined with respect to the axial direction of the hinge shaft by engaging the other end of the torsion coil spring with the second engagement portion so that the other end of the torsion coil spring can be engaged in a stable manner. Because the rotation of the other end of the torsion coil spring around the hinge shaft relative to the flap is permitted, the position of the other end of the torsion coil spring onto the second engagement portion is facilitated.

In this invention, the flap may be provided with a seal member (24) for sealing an interface between the flap and the main body when the flap is in a closed position.

According to this arrangement, when the flap is in the closed position, the seal member ensures a favorable seal between the flap and the main body so that the opening can be closed in a reliable manner.

The present invention further provides a gas liquid separation device provided with the flap valve device as defined above, wherein the flap valve device serves as an outlet for separated liquid.

According to this arrangement, the gas liquid separation device can be made simple in structure and easy to assemble.

In this invention, the main body may comprise a pipe extending vertically with a closed upper end and a lower end defining the opening, an interior of the main body being separated by a partition wall (11) into a first passage (12) and a second passage (13) that extend vertically, an upper end of the first passage defining an inlet (15) for receiving liquid, an upper end of the second passage defining an outlet (16) for expelling liquid; wherein the flap is provided on a lower end of the main body to selectively close the opening; and wherein the lower end of the main body projects into a filler pipe connecting a fuel tank (51) of a vehicle with a filler opening (52), and the inlet is connected to a fuel tank side of a fuel vapor passage connecting the fuel tank with the canister (55) while the outlet is connected to a canister side of the fuel vapor passage (54).

According to this arrangement, the gas liquid separation device configured to be provided in a passage for conducting fuel vapor from the fuel tank to the fuel vapor canister can be constructed as a highly simple unit.

Effect of the Invention

According to such arrangements, in a flap valve device and a gas liquid separation device provided with a flap valve device, the flap valve device can be made highly compact, and easy to assemble.

DETAILED DESCRIPTION OF THE PREFERRED EMBODIMENT(S)

The flap valve device and the gas liquid separation device provided with the flap valve device are described in the following with reference to the appended drawings. The gas liquid separation device of the illustrated embodiment is provided in a fuel vapor passage connecting the fuel tank with the fuel vapor canister in a motor vehicle, and is configured to return the separated fuel liquid into the filler pipe.

Figure 1:
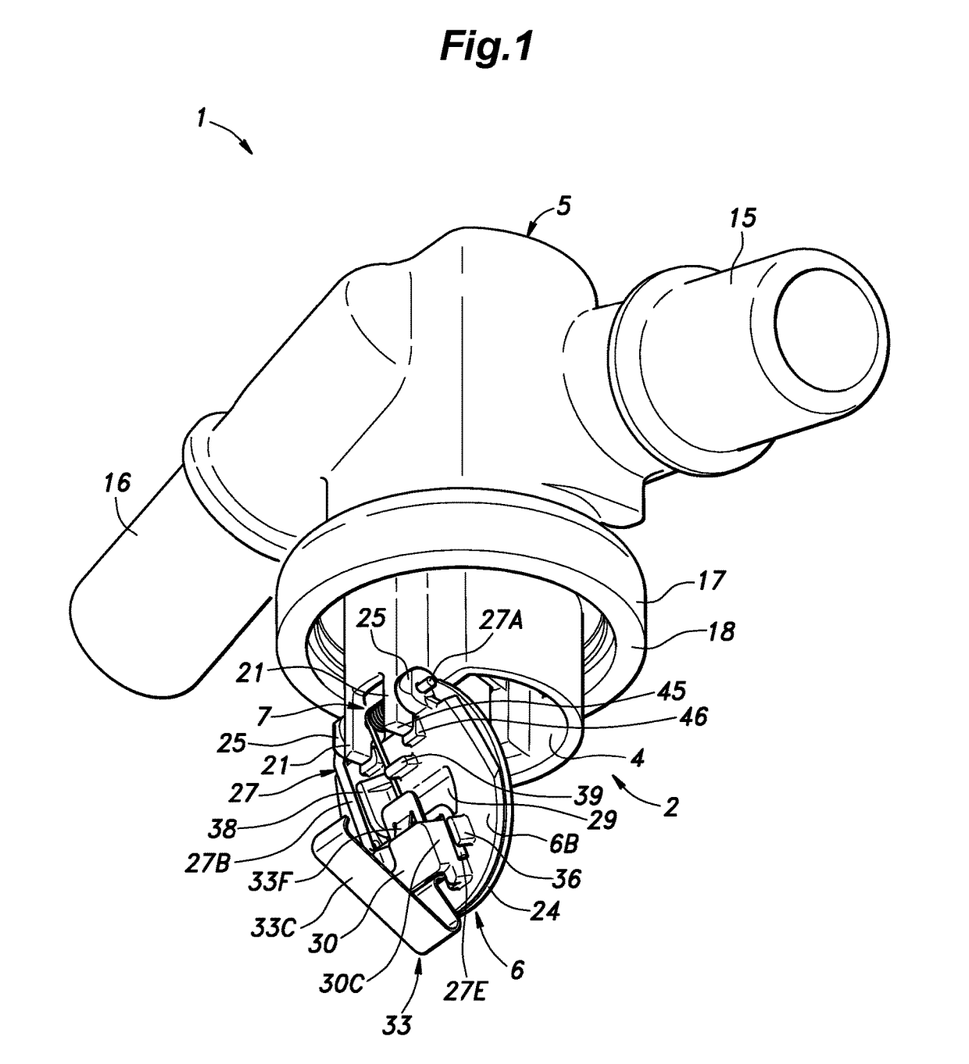
FIG. 1 is a perspective view of a gas liquid separation device provided with a flap valve device embodying the present invention.
Figure 2:
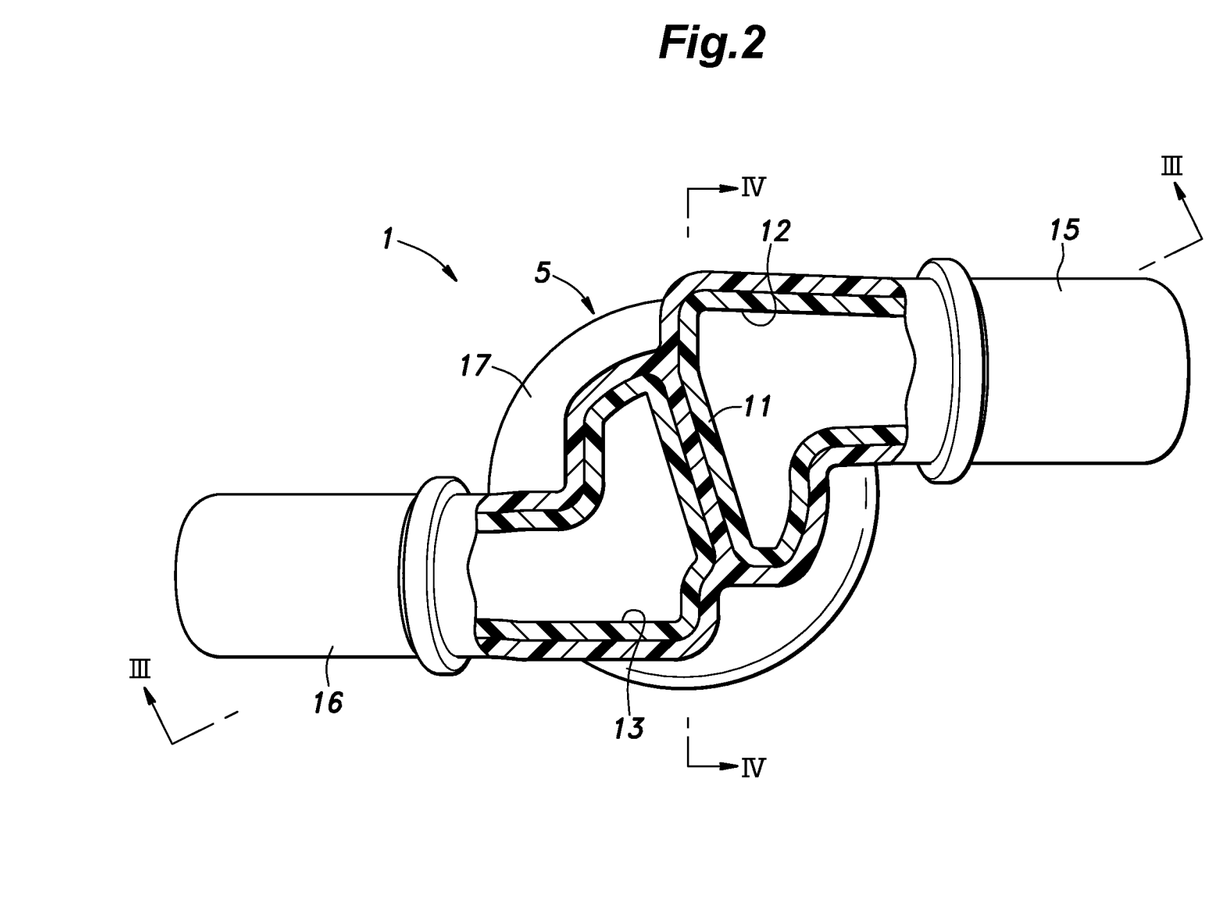
FIG. 2 is a cross sectional view of the gas liquid separation device.
Figure 3:
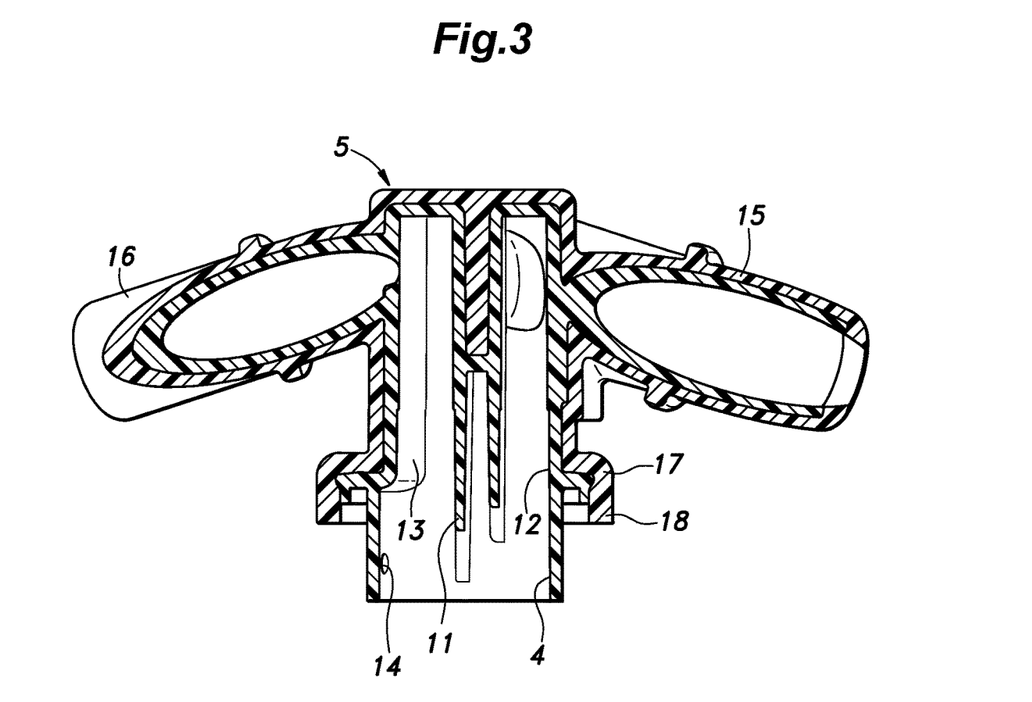
FIG. 3 is a sectional view taken along line III-III of FIG. 2.

As shown in FIGS. 1 to 3, the gas liquid separation device 1 is provided with the flap valve device 2 which includes a main body 5 having an opening 4, a flap 6 configured to selectively open the opening 4 and a torsion coil spring 7 provided between the main body 5 and the flap 6 to urge the flap 6 in the closing direction.

The main body 5 is tubular in shape, and extends vertically with a closed upper end and an open lower end (the opening 4). The main body 5 is internally provided with a partition wall 11 extending in the axial direction. The partition wall 11 diametrically separates the interior of the main body 5 into a first passage 12 and a second passage 13 both extending in the vertical direction. The lower end of the partition wall 11 is positioned higher than the lower end of the main body 5 so that the two lower ends of the first passage 12 and the second passage 13 communicate with each other. A through hole 14 is passed through a part of the main body 5 slightly spaced from the lower end thereof so as to communicate the interior and the exterior of the main body 5 with each other.

An inlet tube 15 and an outlet tube 16 project from opposite sides of the upper end of the main body 5. The base ends of the inlet tube 15 and the outlet tube 16 are 180 degrees apart along the outer periphery of the main body 5. The inlet tube 15 and the outlet tube 16 extend tangentially and in opposite directions from the outer peripheral parts of the main body 5. The interior of the inlet tube 15 communicates with the upper end of the first passage 12, and the interior of the outlet tube 16 communicates with the upper end of the second passage 13. The inlet tube 15 and the outlet tube 16 are provided with a downward slant toward the respective free ends thereof which define open ends.

An intermediate portion of the main body 5 with respect to the lengthwise direction is formed with a circular flange 17 extending radially outward. The outer periphery of the flange 17 is provided with a peripheral wall 18 extending vertically downward. The peripheral wall 18 extends along the outer periphery of the flange 17 in an annular fashion.

The main body 5, the inlet tube 15, the outlet tube 16 and the flange 17 are integrally molded by plastic material. The main body 5, the inlet tube 15, the outlet tube 16 and the flange 17 are two-color injection molded in such a manner that the outer side and the inner side of the main body 5, the inlet tube 15, the outlet tube 16 and the flange 17 are formed as an outer layer and an inner layer, respectively. The outer layer is made of stiffer material than the inner layer, such as HDPE. The inner layer functions as a barrier layer made of material having a low permeability for gasoline, such as plastic material consisting of a mixture of PA6 (nylon 6) and HDPE. The downward facing end surface of the peripheral wall 18 is formed by the outer layer.

As shown FIGS. 1 to 5, an outer side part of the lower end of the main body 5 is provided with a pair of main body side bearings 21 which are spaced apart from each other along the tangential direction of the main body 5, and define respective bearing holes extending coaxially in the tangential direction. Each bearing hole consists of a through hole. In the following description, the axial line of the bearing holes is assumed as extending in the lateral direction.

Figure 4:
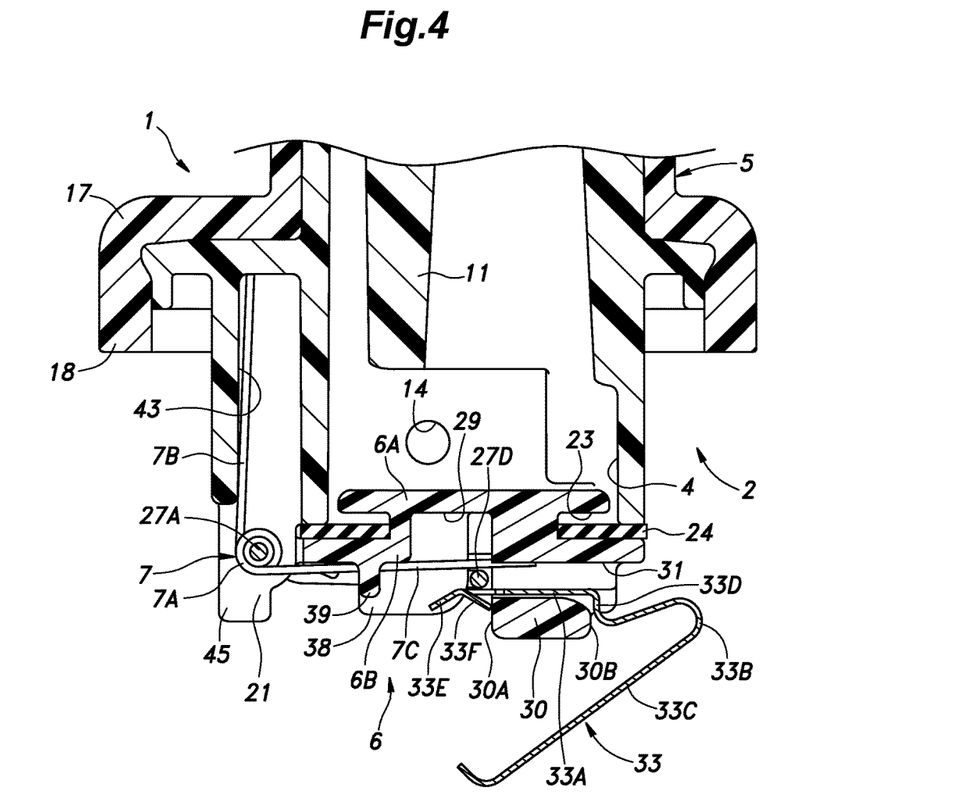
FIG. 4 is a sectional view taken along line IV-IV of FIG. 2 when the flap is closed.
Figure 5:
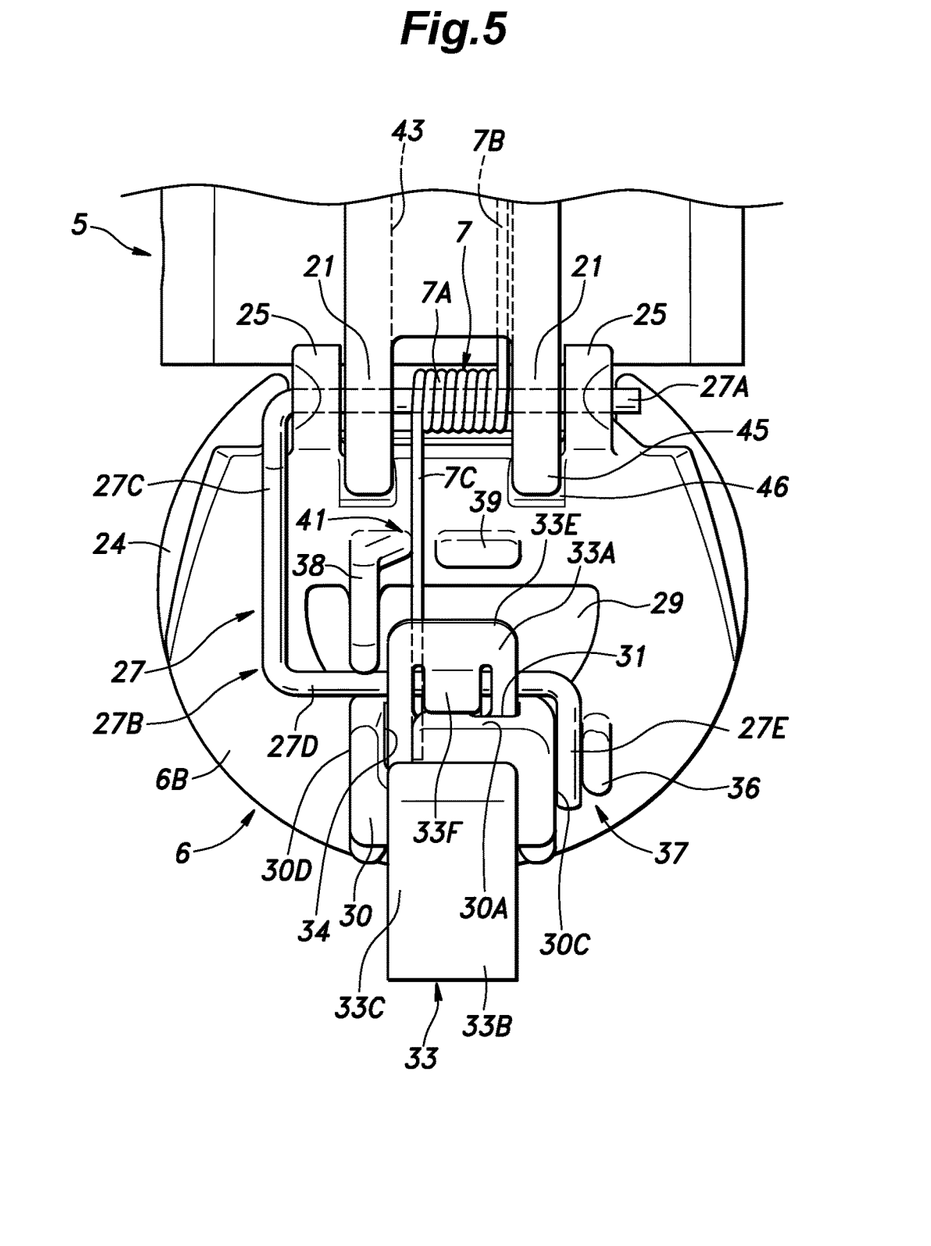
FIG. 5 is a side view of the flap valve device.

As shown in FIGS. 1, 4 and 5, the lower end of the main body 5 is pivotally fitted with a flap 6 for selectively closing the opening 4. The flap 6 consists of a disk-shaped lid, and is made of plastic material such as POM. As shown in FIG. 4, the flap 6 includes an inner part 6A and an outer part 6B positioned one over the other, and the inner part 6A has a smaller diameter than the outer part 6B so as to define a stepped outer periphery. The outer diameter of the outer part 6B is greater than the inner diameter of the opening 4 of the main body 5, and the outer diameter of the inner part 6A is smaller than the inner diameter of the opening 4 of the main body 5 so that the inner part 6A of the flap 6 projects into the opening 4 while the outer part of the flap 6 remains on the outer side of the opening 4. An annular engagement groove 23 is defined along the periphery of the flap 6 between the inner part 6A and the outer part 6B. An annular seal member 24 is fitted into the annular engagement groove 23. Thereby, when the flap 6 is in the closed position, the outer part 6B abuts the periphery of the opening 4 via the seal member 24.

As shown in FIGS. 1 and 5, a pair of flap side bearings 25 are provided on an outer peripheral part of the outer part 6B of the flap 6. The flap side bearings 25 are spaced apart from each other along the tangential direction of the flap 6, and define respective bearing holes extending coaxially in the tangential direction. Each bearing hole consists of a through hole.

The flap side bearings 25 of the flap 6 are connected to the main body side bearings 21 of the main body 5 via a connecting member 27 so that the flap 6 is pivotally attached to the main body 5. The connecting member 27 includes a hinge shaft 27A extending in the axial direction, and an extension 27B extending from an end of the hinge shaft 27A. In the illustrated embodiment, the connecting member 27 is formed by bending a metallic rod into a prescribed shape. The hinge shaft 27A extends linearly. The extension 27B includes a base end 27C bent from an end of the hinge shaft 27A in a perpendicular direction, an intermediate portion 27D bent from the other end of the base end 27C in parallel with the hinge shaft 27A and a free end 27E extending from the other end of the intermediate portion 27D in a perpendicular direction.

The flap 6 is positioned relative to the main body 5 such that the two main body side bearings 21 are interposed between the two flap side bearings 25. The bearings holes of the flap side bearing 25 and the main body side bearings 21 are coaxially aligned with one another, and the hinge shaft 27A of the connecting member 27 is passed into one of the flap side bearings 25, one of the main body side bearings 21, the other main body side bearing 21 and the other flap side bearing 25, in that order, so that the flap 6 is pivotally attached to the main body 5 via the connecting member 27. Under this condition, the axial line of the bearings holes of the flap side bearing 25 and the main body side bearings 21 and the axial line of the hinge shaft 27A extend laterally.

The connecting member 27 is thus able to pivot around the hinge shaft 27A relative to the main body 5 and the flap 6 when the connecting member 27 is passed through the flap side bearings 25 and the main body side bearings 21. The extension 27B can be positioned onto the outer part 6B of the flap 6 by pivoting the connecting member 27 around the hinge shaft 27A.

As shown in FIGS. 1, 4 and 5, the outer part 6B of the flap 6 is centrally formed with a recess 29 having a semi-circular cross section. A support base 30 having a rectangular shape projects from a part of the outer part 6B on the side opposite from the flap side bearings 25 with respect to the recess 29. A first side wall 30A provided on a side of the support base 30 adjacent to the recess 29 opposes the flap side bearings 25 and extends substantially in parallel with the hinge shaft 27A. The side of the support base 30 opposite to the first side wall 30A is formed with a second side wall 30B. A slot 31 is passed through the first side wall 30A and the second side wall 30B in a direction perpendicular to the hinge shaft 27A. The slot 31 is provided with a rectangular, laterally elongated cross section, and is configured to accept a support member 33 which will be described hereinafter. The projecting end surface of the support base 30 is formed with a slit 34 communicating with the slot 31. The slit 34 extends in a direction perpendicular to the hinge shaft 27A, and is passed through the first side wall 30A at an end thereof.

The two lateral sides of the support base 30 is formed with a third side wall 30C and a fourth side wall 30D, respectively, in a perpendicular relationship to the first side wall 30A and the second side wall 30B. The third side wall 30C is located on the side corresponding to the free end of the hinge shaft 27A (on the right hand side in FIG. 5). A first projection 36 is formed on the outer part 6B of the flap 6 laterally spaced from the third side wall 30C by a prescribed distance, and is elongated in a direction perpendicular to the hinge shaft 27A. The third side wall 30C and the first projection 36 jointly define a first engagement portion 37 formed as a groove extending in a direction perpendicular to the hinge shaft 27A.

The outer part 6B of the flap 6 is further provided with a second projection 38 and a third projection 39. The second projection 38 is L-shaped, and has a first end extending in parallel with the hinge shaft 27A and a second end extending into the recess 29 toward the support base 30 on a part of the outer part 6B of the flap 6 located between the recess 29 and the flap side bearings 25. The end of the second projection 38 extending toward the support base 30 is spaced from the first side wall 30A by a prescribed distance. The third projection 39 is laterally spaced from the right end of the second projection 38 by a prescribed distance. Thereby, the second projection 38 and the third projection 39 jointly define a second engagement portion 41 formed as a groove extending in a direction perpendicular to the hinge shaft 27A. The end part of the second projection 38 opposing the third projection 39 defines a sloping surface that decreases in height toward the third projection 39.

The connecting member 27 is arranged such that the extension 27B extends along the outer part 6B of the flap 6, and the intermediate portion 27D extends between the second projection 38 and the support base 30 along the first side wall 30A. The free end 27E is positioned in the first engagement portion 37. Owing to the positioning of the free end 27E in the first engagement portion 37, the free end 27E is prevented from moving laterally by the third side wall 30C and the first projection 36. Owing to the engagement of the free end 27E by the first engagement portion 37, the connecting member 27 is prevented from moving laterally or along the axial direction of the hinge shaft 27A, and the hinge shaft 27A is kept received in the main body side bearings 21 and the flap side bearings 25.

The support member 33 is configured to receive the external force for rotating the flap 6. The support member 33 is formed by bending a sheet spring consisting of a metallic strip. The support member 33 is provided with an insertion end 33A inserted in the slot 31 at a lengthwise end thereof, a bent portion 33B bent into a hairpin shape in a lengthwise intermediate part thereof and a pressure receiving portion 33C for receiving an external force at the other lengthwise end thereof.

The insertion end 33A is passed into the slot 31 from the side of the second side wall 30B to the first side wall 30A. The insertion end 33A is provided with a shoulder portion 33D abutting the second side wall 30B. The shoulder portion 33D is formed by bending the support member 33 in a crank shape. The insertion depth of the insertion end 33A into the slot 31 is determined by the abutment of the shoulder portion 33D onto the second side wall 30B.

The insertion end 33A is formed with a curved portion 33E in the free end thereof, and the curved portion 33E extends out of the slot 31 from the open end of the slot 31 on the side of the first side wall 30A. The curved portion 33E can pass through the slot 31 by deflecting, and regain the original shape after passing through the slot 31. Thereby, the insertion end 33A is normally retained in the slot 31. The curved portion 33E is formed with an elastic claw 33F by virtue of a C-shaped cut made therein. The projecting end of the elastic claw 33F faces the first side wall 30A so that the insertion end 33A can be even more securely retained in the slot 31 by the abutting of the projecting end of the elastic claw 33F onto the first side wall 30A.

The end (main part) of the insertion end 33A opposite to the free end extends outward in the radial direction of the flap 6. The pressure receiving portion 33C is connected to the insertion end 33A via the bent portion 33B, and folded back radially from an radially outer part to a radially inner part of the flap 6. The pressure receiving portion 33C extends with a certain incline such that the distance to the outer part 6B of the flap 6 increases toward the center of the flap 6.

The support member 33 is mounted on the flap 6 and the insertion end 33A projects from the first side wall 30A in such a manner that the insertion end 33A extends above the intermediate portion 27D of the connecting member 27. Owing to the retention of the intermediate portion 27D by the insertion end 33A, the rotation of the connecting member 27 around the hinge shaft 27A is restricted, and the free end 27E is kept engaged by the first engagement portion 37. In other words, by mounting the support member 33 on the flap 6, the connecting member 27 is prevented from coming off the flap 6 so that the flap 6 is supported by the main body 5 in a stable manner.

The torsion coil spring 7 includes a coil portion 7A and a first and second end 7B, 7C extending tangentially from either end of the coil portion 7A. The coil portion 7A is positioned between the two main body side bearings 21, and internally receives the hinge shaft 27A so that the coil portion 7A is rotatably supported by the hinge shaft 27A. The part of the main body 5 located between the two main body side bearings 21 is provided with a spring engagement portion 43 for engaging the first end 7B of the torsion coil spring 7. The spring engagement portion 43 consists of a hole elongated in the lengthwise direction, and has an open lower end. The first end 7B of the torsion coil spring 7 is engaged by the spring engagement portion 43 by being loosely received in the spring engagement portion 43, and contacting the peripheral edge of the hole (spring engagement portion 43).

The second end 7C of the torsion coil spring is passed between the intermediate portion 27D of the connecting member 27 and the flap 6, and extends into the slot 31. The torsion coil spring 7 urges the flap 6 in the opening direction relative to the main body 5, and the second end 7C contacts the side of the intermediate portion 27D facing the flap 6, and is engaged thereby.

A stopper 45 extends downward from each main body side bearing 21. The outer part 6B of the flap 6 is formed with seats 46 for the respective stoppers 45 to abut on. The open position (maximum open position) of the flap 6 relative to the main body 5 is determined by the abutting of the stoppers 45 onto the respective seats 46.

The gas liquid separation device 1 described above can be assembled as discussed in the following. First of all, the flap 6 is positioned relative to the main body 5 such that the main body side bearings 21 are positioned between the flap side bearings 25 in a coaxial arrangement. The torsion coil spring 7 is then positioned on the main body 5 such that the first end 7B of the torsion coil spring 7 is inserted into and engaged by the spring engagement portion 43, and the coil portion 7A is positioned between the main body side bearings 21 in a coaxial arrangement with the axial line of the bearings 21 and 25. The hinge shaft 27A of the connecting member 27 is passed into the flap side bearings 25, the main body side bearings 21 and the coil portion 7A of the torsion coil spring 7 arranged in a mutually coaxial relationship. Thereby, the main body 5, the flap 6 and the torsion coil spring 7 are provisionally assembled via the hinge shaft 27A.

The second end 7C of the torsion coil spring 7 is positioned between the intermediate portion 27D of the connecting member 27 and the flap 6. This positioning step for the second end 7C is performed simultaneously as or before completing the insertion of the hinge shaft 27A. Because the coil portion 7A of the torsion coil spring 7 is readily deformable, the positioning of the second end 7C can be performed easily even after the hinge shaft 27A has been inserted.

The connecting member 27 is rotated around the hinge shaft 27A against the biasing force of the torsion coil spring 7 until the connecting member 27 comes into contact with the outer part 6B of the flap 6 with the result that the free end 27E of the connecting member 27 is positioned in the first engagement portion 37 and the intermediate portion 27D is positioned adjacent to the first side wall 30A. At this time, the second end 7C of the torsion coil spring 7 that may be moved with the connecting member 27 is passed into the slot 31 via the slit 34, and positioned in the second engagement portion 41. As the second end 7C advances into the second engagement portion 41, the second end 7C is guided by the sloping surface of the second projection 38, and is positioned in the prescribed location of the second engagement portion 41. The lateral position of the torsion coil spring 7 is determined by the second end 7C being positioned in the second engagement portion 41.

The insertion end 33A of the support member 33 is then inserted into the slot 31. As the insertion end 33A is forced into the slot 31, the curved portion 33E and the elastic claw 33F deflect by being pressed by the peripheral edge of the slot 31 so that the insertion end 33A gets through the slot 31. Once the free end of the insertion end 33A projects out of the slot 31, the curved portion 33E regains the original shape so that the insertion end 33A is prevented from coming off the slot 31. Also, because the elastic claw 33F also regains the original shape, the projecting end of the elastic claw 33F abuts the first side wall 30A so that the support member 33 is prevented from coming off the slot 31.

Because the insertion end 33A projects from the slot 31, the intermediate portion 27D of the connecting member 27 is engaged by the insertion end 33A so that the rotation of the connecting member 27 around the hinge shaft 27A is prevented. Because the rotation of the connecting member 27 around the hinge shaft 27A is prevented, the free end 27E is kept engaged by the first engagement portion 37, and the lateral movement of the connecting member 27 is prevented. Therefore, the hinge shaft 27A is prevented from moving out of the main body side bearings 21, the flap side bearings 25 and the coil portion 7A of the torsion coil spring 7. Thus, the assembly work of the flap valve device 2 can be carried out in a highly simple manner without requiring tools.

Figure 6:
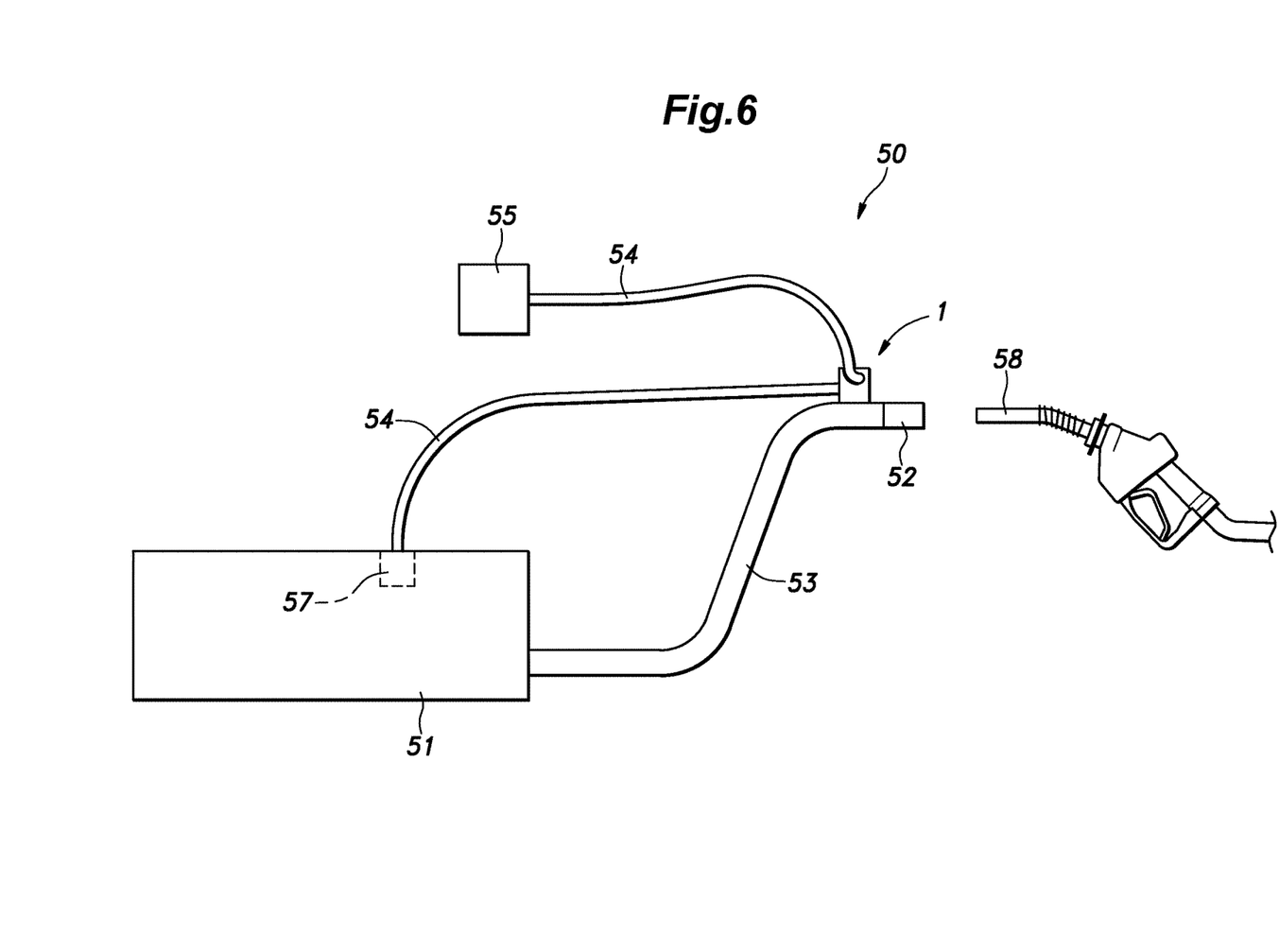
FIG. 6 is a diagram showing the fuel system of a motor vehicle incorporated with the gas fuel separation device.
Figure 7:
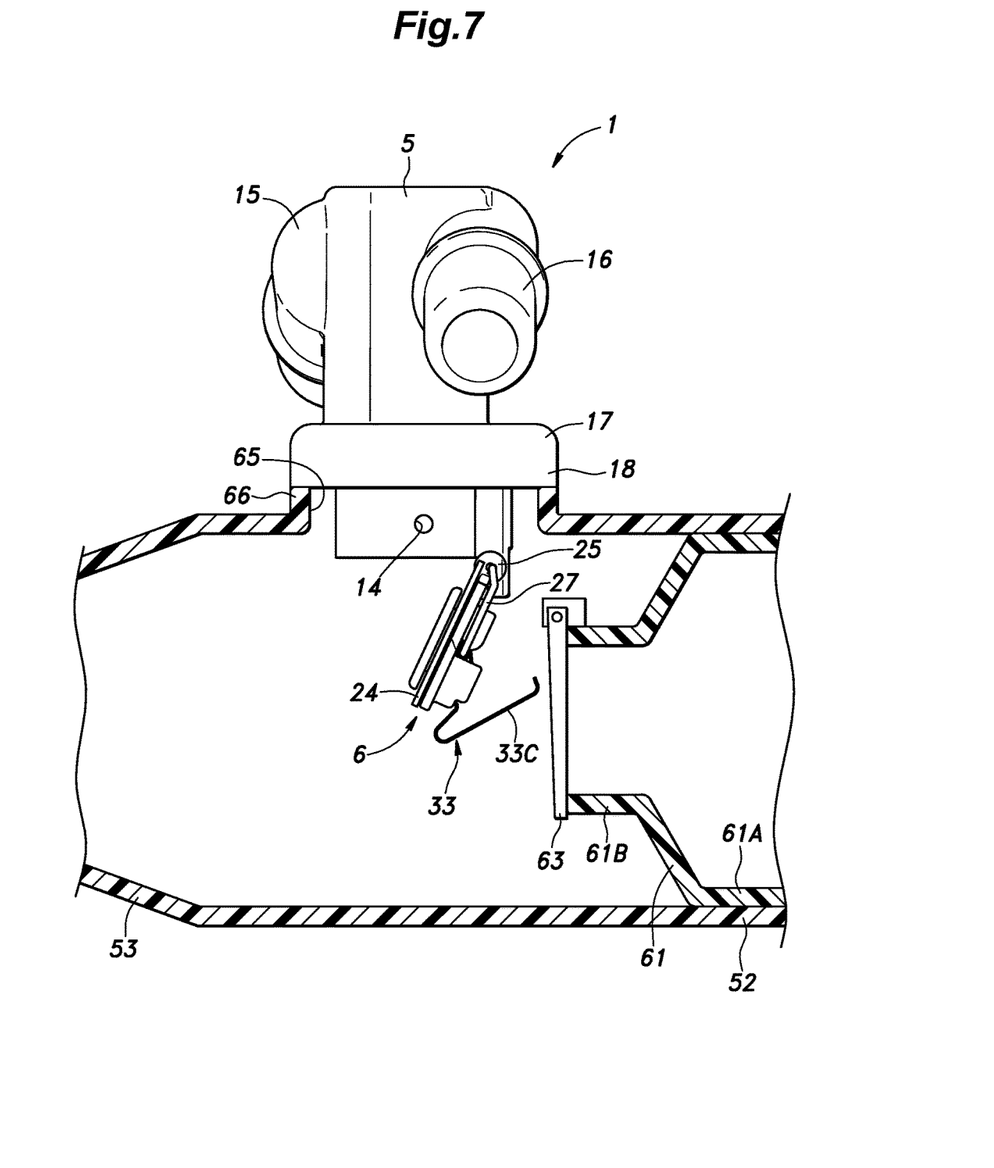
FIG. 7 is a section view of the fuel system for demonstrating the mode of operation of the gas fuel separation device.
Figure 8:
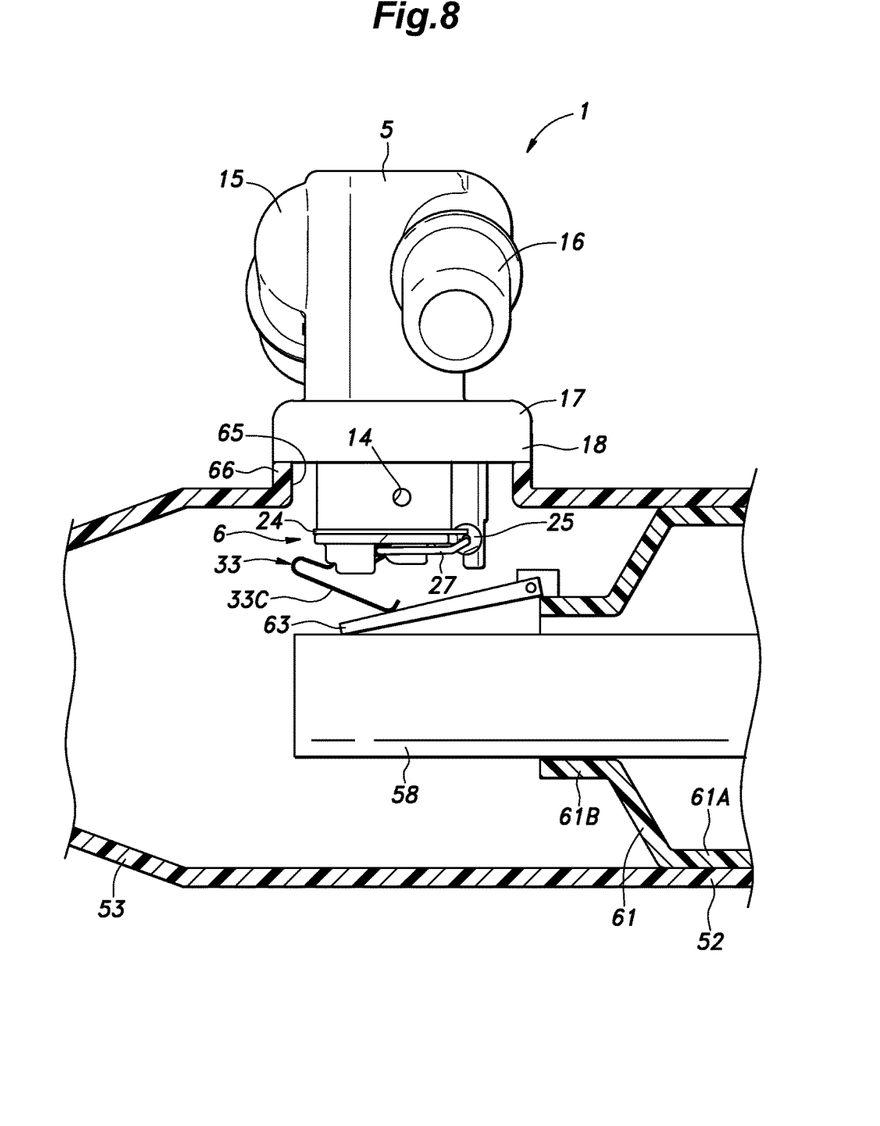
FIG. 8 is a section view of the fuel system for demonstrating the mode of operation of the gas fuel separation device.

Referring to FIGS. 6 to 8, the arrangement for installing the gas liquid separation device 1 in a motor vehicle is described in the following. As shown in FIG. 6, a fuel system 50 for a motor vehicle includes a fuel tank 51, a filler pipe 53 connecting the fuel tank 51 with a filler opening 52, a fuel vapor passage 54 for expelling fuel vapor from the fuel tank 51 to the outside and a fuel vapor canister 55 provided in the fuel vapor passage 54 for absorbing fuel vapor. The fuel absorbed by the canister 55 is expelled therefrom by intake negative pressure of an engine intake system not shown in the drawings, and introduced into the combustion chambers of the engine via the intake system.

An end of the fuel vapor passage 54 opens out in an upper part of the fuel tank 51, and this open end of the fuel vapor passage 54 is provided with a float valve 57. The float valve 57 moves vertically in dependence on the liquid level in the fuel tank 51, and closes the fuel vapor passage 54 when the liquid level exceeds a prescribed value. Therefore, when the liquid level of the fuel in the fuel tank 51 rises by refueling, the fuel vapor passage 54 is closed by the float valve 57, and the fuel liquid is prevented from flowing into the fuel vapor passage 54. If refueling is continued after the float valve 57 is closed, the liquid level of the fuel in the filler pipe 53 rises, and comes into contact with the filler nozzle 58 (filler gun) of the fuel dispenser of the filling station so that the fuel dispenser detects the full condition of the fuel tank 51, and stops the supply of fuel from the filler nozzle 58.

As shown in FIG. 7, an inner tube 61 defining the filler opening 52 is provided in the outer end of the filler pipe 53. The outer end 61A of the inner tube 61 is given with a greater outer diameter and inner diameter than the inner end 61B of the inner tube 61 such that the outer peripheral surface of the outer end 61A of the inner tube 61 is in contact with the inner peripheral surface of the filler pipe 53. The inner tube 61 is tapered in the part thereof between the inner end 61B and the outer end 61A from the outer end side to the inner end side. A flap valve 63 is pivotally attached to the inner end of the inner tube 61 for selectively closing the inner end of the inner tube 61. The flap valve 63 is urged in the closing direction by a spring not shown in the drawing. When the filler nozzle 58 is inserted in the filler opening 52, and the flap valve 63 is pushed by the tip of the filler nozzle 58, the flap valve 63 opens.

An upper part of the filler pipe 53 more inward than the flap valve 63 (on the side of the fuel tank 51) is formed with a vertically passed mounting hole 65. The surrounding part of the mounting hole 65 projects outward (upward) of the filler pipe 53 to define a boss 66. The gas liquid separation device 1 is mounted on this mounting hole 65. The end surface of the peripheral wall 18 of the flange 17 of the gas liquid separation device 1 abuts the opposing end surface of the boss 66, and is welded thereto by vibration welding. The lower end of the main body 5 of the gas liquid separation device 1 and the flap 6 project into the filler pipe 53. The gas liquid separation device 1 is positioned on the filler pipe 53 in such a manner that the flap 6 in the open position faces the outer end of the filler pipe 53 and opposes the flap valve 63.

The inlet tube 15 of the gas liquid separation device 1 is connected to a fuel tank 51 side part of the fuel vapor passage 54, and the outlet tube 16 is connected to a canister 55 side part of the fuel vapor passage 54.

In this gas liquid separation device 1 constructed as described above, when the liquid level of the fuel tank 51 has suddenly risen or when bubbling of fuel has occurred in the fuel tank 51, fuel liquid may advance into the fuel vapor passage 54 via the float valve 57, but the fuel liquid that has advanced into the fuel vapor passage 54 can be expelled to the filler pipe 53. The fuel vapor and the fuel liquid that flow in the fuel vapor passage 54 eventually flow into the gas liquid separation device 1. When the flap 6 is open as shown in FIG. 7, the fuel vapor flows downward in the first passage 12, and then in the second passage 13 either directly from the first passage 12 or via the interior of the filler pipe 53. The fuel vapor flows upward in the second passage 13, and is introduced into the canister 55 via the outlet tube 16. Meanwhile, the fuel liquid flows downward in the first passage 12 under the gravitational force, and drops into the filler pipe 53. The fuel liquid that has dropped into the filler pipe 53 then flows into the fuel tank 51, and is thereby recovered. In this manner, the fuel in the fuel vapor passage 54 is separated into gas and liquid. The flap valve device 2 of the gas liquid separation device 1 functions as an outlet for releasing the separated liquid to the outside.

As shown in FIG. 8, when the filler nozzle 58 is inserted into the filler opening 52, and the flap valve 63 is thereby forced open, the flap 6 is pushed by the flap valve 63 at the support member 33, and forced to the closed position against the biasing force of the torsion coil spring 7. As the support member 33 is elastically deformable, once the flap valve 63 is opened beyond a certain open position, the flap 6 is maintained in the closed position. In other words, the flap valve 63 can open even further than the open position that is required to force the flap 6 to the closed position thereof. Owing to the elastic deformation of the support member 33, the flap 6 is biased in the closed direction, and abuts the lower end of the main body 5 via the seal member 24. Thus, when the filler nozzle 58 is inserted in the filler pipe 53, the flap 6 is closed so that the fuel liquid that is supplied from the filler nozzle 58 into the filler pipe 53 is prevented from advancing into the gas liquid separation device 1.

When the flap 6 is in the closed position, a gap is created between the inner part 6A of the flap 6 and the lower end of the partition wall 11. Therefore, even when the flap 6 is in the closed position, the first passage 12 and the second passage 13 are communicated with each other at the lower end. The fuel vapor and the fuel liquid that flow in the fuel vapor passage 54 both flow downward in the first passage 12. The fuel vapor then flows upward in the second passage 13, and flows into the canister 55 via the outlet tube 16. Meanwhile, the fuel liquid is unable to flow upward in the second passage 13 on account of the gravitational force, and is trapped on top of the inner part 6A of the flap 6. When the trapped fuel liquid increases beyond a certain limit, the fuel liquid passes through the through hole 14, and is expelled to the filler pipe 53. Therefore, the communication between the first passage 12 and the second passage 13 is maintained at all times. When the flap 6 is in the closed position, the through hole 14 communicates the first passage 12 and the second passage 13 of the main body 5 with the interior of the filler pipe 53. As a result, a part of the fuel vapor that flows from the fuel vapor passage 54 to the first passage 12 and the second passage 13 passes into the filler pipe 53 via the through hole 14, and is returned to the fuel tank 51 once again.

When the filler nozzle 58 is pulled off from the filler opening 52, and the flap valve 63 rotates to the closed position, the flap 6 rotates to the open position under the biasing force of the torsion coil spring 7, and the fuel liquid trapped on top of the inner part 6A of the flap 6 is expelled to the interior of the filler pipe 53.

The advantages of the flap valve device 2 and the gas liquid separation device 1 fitted with the flap valve device 2 are discussed in the following. In the flap valve device 2 and the gas liquid separation device 1 of the illustrated embodiment, the main body 5, the flap 6, the connecting member 27, the torsion coil spring 7 and the support member 33 can be assembled by the engagement features provided in these components, and the need for crimping and other work requiring tools is eliminated. Because the extension 27B is retained by using the support member 33 engaged by the outer part 6B of the flap 6, the extension 27B can be engaged by the flap 6 simply by positioning the extension 27B to a prescribed position on the flap 6 and engaging the support member 33 with the flap 6 so that the work required for attaching the extension 27B to the flap 6 can be facilitated.

When the support member 33 is yet to be attached to the flap 6, the positioning of the extension 27B onto the first engagement portion 37 is facilitated because the extension 27B can be readily moved to the first engagement portion 37 simply by rotating the extension 27B around the hinge shaft 27A.

The specific embodiment of the present invention has been described above, but the present invention is not limited by such an embodiment, and can be modified in various ways without departing from the spirit of the present invention. For instance, the first engagement portion 37 is formed as a groove defined by the third side wall 30C and the first projection 36, but may also be defined solely by the third side wall 30C by omitting the first projection 36. In other words, the first engagement portion 37 is not necessarily required to prevent the lateral movement of the connecting member 27 in the lateral direction, and it suffices if the first engagement portion 37 is at least able to restrict the hinge shaft 27A from coming out of the associated bearings.

| GLOSSARY OF TERMS | | | |
|---|---|---|---|
| 1 | gas liquid separation device | 2 | flap valve device |
| 4 | open end | 5 | main body |
| 6A | inner part | 6B | outer part |
| 7 | torsion coil spring | 7A | coil |
| 7B | first end | 7C | second end |
| 11 | partition wall | 12 | first passage |
| 13 | second passage | 15 | inlet tube (inlet) |
| 16 | outlet tube (outlet) | 21 | main body side bearing |
| 23 | engagement groove | 24 | seal member |
| 25 | flap side bearing | 27 | connecting member |
| 27A | hinge shaft | 27B | extension |

-continued

GLOSSARY OF TERMS

| 27C | base end | 27D | intermediate portion |
|---|---|---|---|
| 27E | free end | 30 | support base |
| 31 | slot (through hole) | 33 | support member |
| 33A | insertion end | 33B | bent portion |
| 33C | pressure receiving portion | 33D | shoulder portion |
| 33E | curved portion | 33F | elastic claw (engagement claw) |
| 36 | first projection | 37 | first engagement portion |
| 38 | second projection | 39 | third projection |
| 41 | second engagement portion | 43 | spring engagement portion |
| 50 | fuel system | 51 | fuel tank |
| 52 | filler opening | 53 | filler pipe |
| 54 | fuel vapor passage | 55 | canister |
| 57 | float valve | 68 | filler nozzle |

The invention claimed is:

1. A normally open flap valve device comprising a main body having an opening, a flap for selectively closing the opening and a torsion coil spring provided between the main body and the flap for biasing the flap in an opening direction, the flap valve device further comprising:

a main body side bearing provided on the main body;

a flap side bearing provided on the flap;

a connecting member including a hinge shaft passed through the main body side bearing, the flap side bearing and a coil portion of the torsion coil spring so as to serve as a pivot shaft for the flap, and an extension extending from an end of the hinge shaft along an outer part of the flap; and a spring engagement portion provided on the main body for engaging an end of the torsion coil spring;

another end of the torsion coil spring being engaged by the extension, the extension being engaged on the outer part of the flap.

2. The flap valve device according to claim 1, further comprising a support member attached to the outer part of the flap for receiving a force for rotating the flap in a closing direction, the support member engaging the extension on the outer part of the flap.

3. The flap valve device according to claim 2, further comprising a first engagement portion provided on the outer part of the flap for engaging the extension in such a manner that the extension is prevented from moving in an axial direction of the hinge shaft relative to the flap, and is allowed to rotate around the hinge shaft relative to the flap, wherein the support member when attached to the flap engages the extension against a rotational motion of the extension around the hinge shaft, and the extension engages the other end of the torsion coil spring against a rotational motion of the other end of the torsion coil spring around the hinge shaft.

4. The flap valve device according to claim 3, wherein a through hole is formed in the outer part of the flap, and the support member includes a front end passed through the through hole and projecting out of the through hole, and an engagement claw configured to be engaged by a peripheral edge of the through hole.

5. The flap valve device according to claim 2, wherein a through hole is formed in the outer part of the flap, and the support member includes a front end passed through the through hole and projecting out of the through hole, and an engagement claw configured to be engaged by a peripheral edge of the through hole.

6. The flap valve device according to claim 1, wherein the outer part of the flap is provided with a second engagement portion for engaging the other end of the torsion coil spring to restrict a movement of the other end of the torsion coil spring along an axial line of the hinge shaft relative to the flap, and to permit a rotation of the other end of the torsion coil spring around the hinge shaft relative to the flap.

7. The flap valve device according to claim 1, wherein the flap is provided with a seal member for sealing an interface between the flap and the main body when the flap is in a closed position.

8. A gas liquid separation device provided with the flap valve device according to claim 1, wherein the flap valve device serves as an outlet for separated liquid.

9. The gas liquid separation device according to claim 8, wherein the main body comprises a pipe extending vertically with a closed upper end and a lower end defining the opening, an interior of the main body being separated by a partition wall into a first passage and a second passage that extend vertically, an upper end of the first passage defining an inlet for receiving liquid, an upper end of the second passage defining an outlet for expelling liquid;

wherein the flap is provided on a lower end of the main body to selectively close the opening; and wherein the lower end of the main body projects into a filler pipe connecting a fuel tank of a vehicle with a filler opening, and the inlet is connected to a fuel tank side of a fuel vapor passage connecting the fuel tank with the canister while the outlet is connected to a canister side of the fuel vapor passage.

\* \* \* \* \*